US012730745B2

(12) United States Patent
Li et al.

(10) Patent No.: US 12,730,745 B2
(45) Date of Patent: Sep. 8, 2026

(54) REMOVING RETAINED PERSISTENT VOLUMES FOR CONTAINERIZED APPLICATIONS

(71) Applicant: SAP SE, Walldorf (DE)

(72) Inventors: Wei Li, Shanghai (CN); Xiangjun Xiao, Shanghai (CN); Sreekanth Kozhisseri Pattath, Kerala (IN); Sreeram V, Kerala (IN); Sudheernath Reddy Kaipa, Andhra Pradesh (IN); Vidhya K, Bangalore (IN)

(73) Assignee: SAP SE, Walldorf (DE)

( * ) Notice: Subject to any disclaimer, the term of this patent is extended or adjusted under 35 U.S.C. 154(b) by 76 days.

(21) Appl. No.: 18/509,570

(22) Filed: Nov. 15, 2023

(65) Prior Publication Data

US 2025/0156311 A1 May 15, 2025

(51) Int. Cl.
*G06F 12/02* (2006.01)

(52) U.S. Cl.
CPC .................................. *G06F 12/023* (2013.01)

(58) Field of Classification Search
None
See application file for complete search history.

(56) References Cited

U.S. PATENT DOCUMENTS 12,026,060 B1 * 7/2024 Theebaprakasam ......................... G06F 11/1464
12,026,061 B1 * 7/2024 Theebaprakasam ......................... G06F 11/1469
12,182,104 B1 * 12/2024 Singh .................... G06F 16/248
2006/0010300 A1 * 1/2006 Arakawa ............. G06F 11/2074 714/E11.107
2009/0248759 A1 * 10/2009 Okada ................. G06F 11/2071
2010/0333116 A1 * 12/2010 Prahlad .................. G06Q 30/02 713/153
2019/0102214 A1 * 4/2019 Kondo ...................... G06F 9/48
2021/0232323 A1 * 7/2021 Kannan ................. G06F 3/0688
2021/0247906 A1 * 8/2021 Sun ..................... G06F 11/1469
2022/0083245 A1 * 3/2022 Kant ..................... G06F 3/0632
2022/0114174 A1 * 4/2022 Glass .................... G06F 16/248
2022/0291851 A1 * 9/2022 Tylik ....................... G06F 3/065
2022/0391124 A1 * 12/2022 Darji ..................... G06F 3/0679
2023/0342267 A1 * 10/2023 Pabón ................... G06F 11/108
2024/0388583 A1 * 11/2024 Pabón ................. H04L 63/0281
2025/0021367 A1 * 1/2025 Juneja ................. G06F 9/45558

(Continued)

*Primary Examiner* — Hosain T Alam
*Assistant Examiner* — Ryan Dare
(74) *Attorney, Agent, or Firm* — SCHWEGMAN LUNDBERG & WOESSNER, P.A.

(57) ABSTRACT

A volume management server may regularly check the status of persistent volumes to determine if they have been released. A database with information about the persistent volumes may be updated to indicate a current date as the release date when a persistent volume is found to be released without a release date. This enables the volume management server to determine, in the future, how long the persistent volume has been released. When the difference between the current date and the release date for a persistent volume reaches a first predetermined age threshold, the volume management server notifies a set of users. When the difference between the current date and the release date for the persistent volume reaches a second predetermined age threshold, the volume management server causes deletion of the persistent volume.

20 Claims, 8 Drawing Sheets

(56) References Cited

U.S. PATENT DOCUMENTS

2025/0023772 A1* 1/2025 Juneja .................... H04L 41/40
2025/0023844 A1* 1/2025 Juneja ................ H04L 61/5007

* cited by examiner

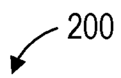
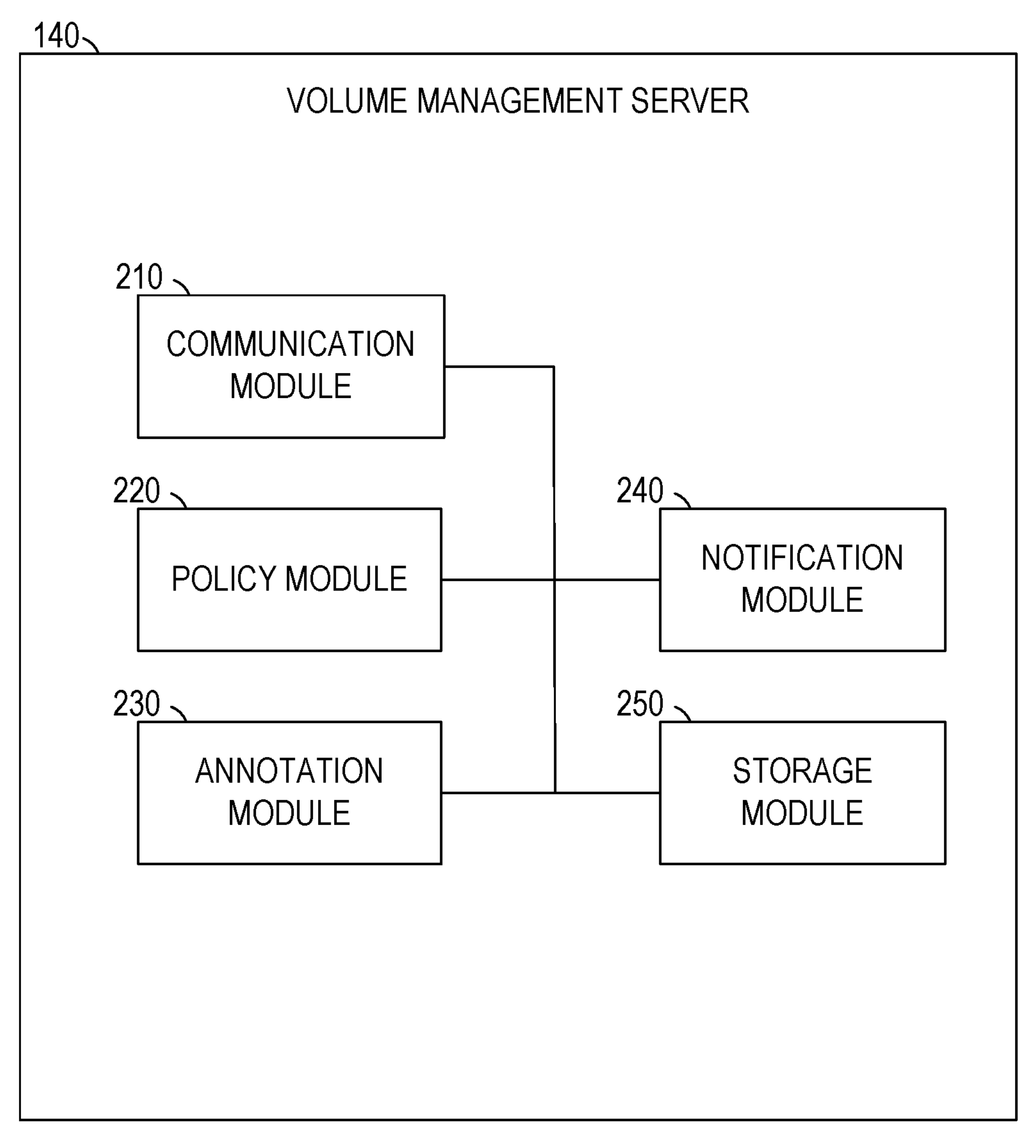
*FIG. 2*

300

| PERSISTENT VOLUME STATUS (310) | | | |
|---|---|---|---|
| VOLUME NAME | STATUS | RETENTION | RELEASE DATE |
| VOL1 | BOUND | RETAIN | NULL |
| VOL2 | RELEASED | RETAIN | 6/1/2023 |
| VOL3 | RELEASED | DELETE | 1/1/2023 |

(320, 330A, 330B, 330C)

| PERSISTENT VOLUME INFO (340) | | |
|---|---|---|
| VOLUME NAME | PVC | STORAGE CLASS |
| VOL1 | RUNDECK-DATA-CLAIM | RWM-RETAIN |
| VOL2 | MYSQL-DATA-CLAIM | RWM-RETAIN |
| VOL3 | RANDOM-DATA-CLAIM | RO-RETAIN |

(350, 360A, 360B, 360C)

| PERSISTENT VOLUME CLAIM (370) | |
|---|---|
| PVC | OWNER NAME |
| RUNDECK-DATA-CLAIM | USER1 |
| MYSQL-DATA-CLAIM | USER2 |
| RANDOM-DATA-CLAIM | USER3 |

REMOVING RETAINED PERSISTENT VOLUMES FOR CONTAINERIZED APPLICATIONS

TECHNICAL FIELD

The subject matter disclosed herein generally relates to automatic maintenance of systems using containerized applications. Specifically, the present disclosure addresses systems and methods to automatically remove unused retained persistent volumes for containerized applications.

BACKGROUND

Containerized applications package an application with its dependencies, making it easier to deploy, move, and manage the application. Clusters allow containers to distribute computing, storage, and networking tasks across computing devices and physical locations.

A persistent volume is a storage resource in a cluster of nodes that run containerized applications. A persistent volume may be provisioned by an administrator before it is used or dynamically provided. A persistent volume claim (PVC) is a request for storage by a user. PVCs consume persistent volume resources. PVCs can request a specific size of persistent volume, a specific access mode (e.g., read only, read write, or write once), or both.

A containerized application may use storage during execution, releasing the storage when the container stops executing. Alternatively, the storage may be allocated as a persistent volume, either automatically or by an administrator. The hardware resources used by the persistent volume are unavailable for use by other applications until the persistent volume is deleted. Thus, if an application is retired but the persistent volume is not deleted, the resources simply remain unused.

BRIEF DESCRIPTION OF THE DRAWINGS

FIG. 2 is a block diagram of a volume management server suitable for automatically removing unused retained persistent volumes for containerized applications, according to some example embodiments.

FIG. 3 is a block diagram illustrating a database schema suitable for use by a volume management server, according to some example embodiments.

DETAILED DESCRIPTION

Example methods and systems are directed to automatically removing unused retained persistent volumes for containerized applications. Unused retained persistent volumes consume resources without providing a benefit, which may increase costs. For example, additional storage devices may be purchased and installed to meet the needs of applications that are being used when existing storage devices would have sufficient storage if unused retained persistent volumes were deleted. However, manual clean up processes can be time-consuming and error prone.

When a persistent volume is being used by a running application, the status of the persistent volume is “Bound.” When the running application terminates, the status of the persistent volume is updated to “Released.” The persistent volume’s retention policy is set to either “Retain” or “Delete.” A persistent volume that is released with retention policy “Delete” may be deleted by the containerized execution environment (e.g., by the Kubernetes Container Storage Interface (CSI) driver) or a scheduled process. A persistent volume with retention policy “Retain” will not be deleted.

A volume management server may regularly check the status of persistent volumes to determine if they have been released. A database with information about the persistent volumes may be updated to indicate a current date as the release date when a persistent volume is found to have been released without a release date. This enables the volume management server to determine, in the future, how long the persistent volume has been released. If the persistent volume becomes active again, the release date is reset.

When the difference between the current date and the release date for a persistent volume reaches a first predetermined age threshold (e.g., 5 days), the volume management server notifies a set of users. If a user indicates that the persistent volume should be kept, the release date is reset to the current date. When the difference between the current date and the release date for the persistent volume reaches a second predetermined age threshold (e.g., 10 days), the volume management server updates the retention policy of the persistent volume from “Retain” to “Delete.”

Using the systems and methods described herein, efforts involved in maintaining and removing persistent volumes are reduced and the efficiency of removing unused persistent volumes is increased. By ensuring that unused persistent volumes are deleted in a timely manner, the waste of storage resources is reduced, improving the effectiveness of the containerized application servers.

Figure 1:
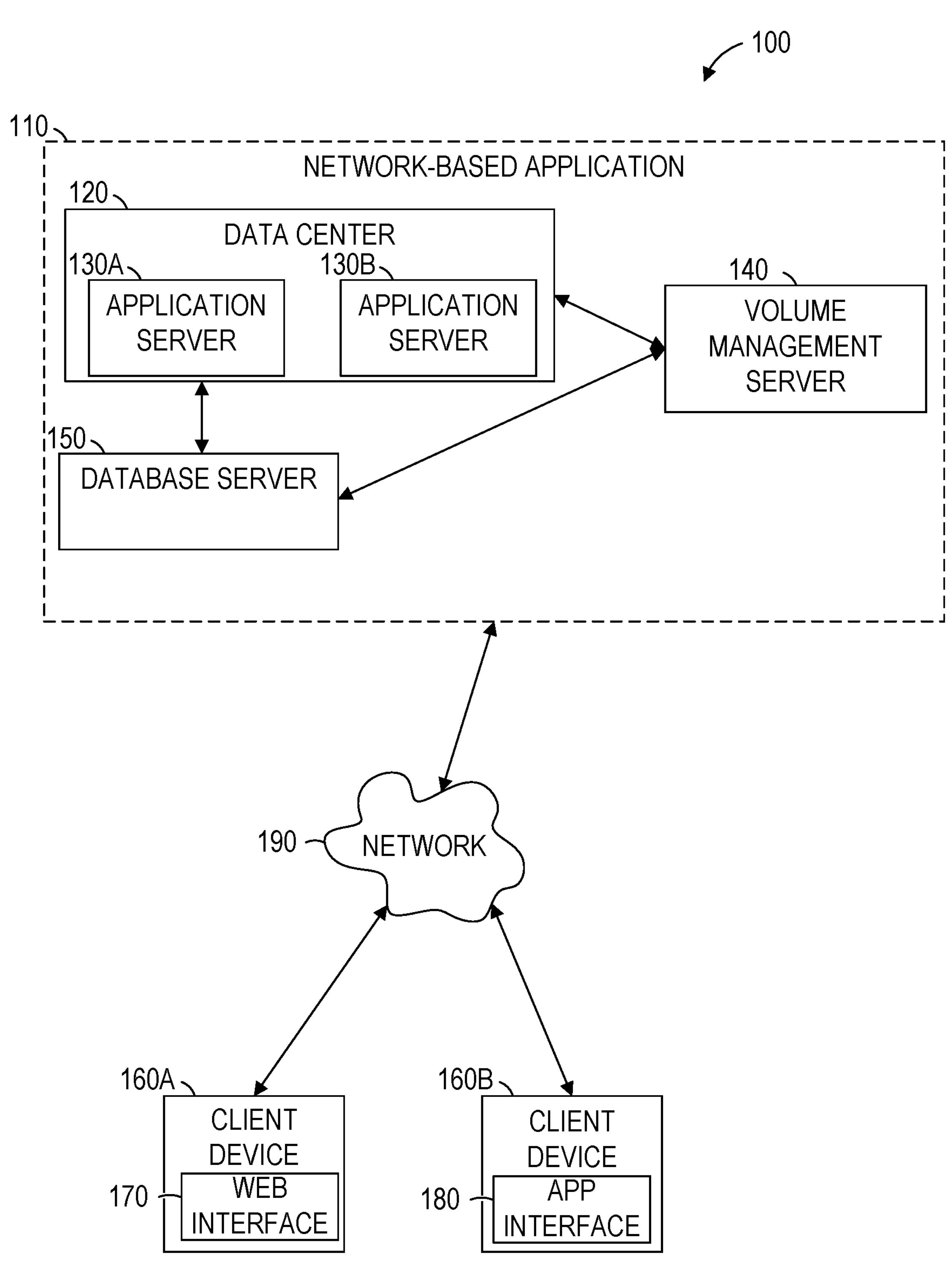
FIG. 1 is a network diagram illustrating an example network environment suitable for automatically removing unused retained persistent volumes for containerized applications.

FIG. 1 is a network diagram illustrating an example network environment 100 suitable for automatically removing unused retained persistent volumes for containerized applications. The network environment 100 includes the network-based application 110, client devices 160A and 160B, and a network 190. The network-based application 110 is provided by application servers 130A and 130B in communication with a database server 150 and a volume management server 140. The application servers 130A-130B are part of a data center 120. The data center 120 allocates resources to the application according to configuration data. For example, a number of processors, number of servers, amount of memory, amount of network bandwidth, and other resources may be configurable.

The application servers 130A-130B access application data (e.g., application data stored by the database server 150) to provide one or more applications to the client devices 160A and 160B via a web interface 170 or an application interface 180. The client devices 160A and 160B may be referred to generically as a client device 160 or in the aggregate as client devices 160. Similarly, the application servers 130A and 130B may be referred to generically as an application server 130 or in the aggregate as application servers 130.

The data center 120 may comprise data storage systems such as network attached storage (NAS), hard drives, solid state drives, and the like. Applications running on the application servers 130A-130B may allocate persistent volumes to store data. When the applications stop executing, the persistent volumes may be retained, allowing the stored data to be available to future executions of the applications. When an application is no longer used, the data storage allocated to persistent volumes may stay allocated indefinitely, decreasing the storage available for use by other applications.

The volume management server 140 may analyze data relating to persistent volumes of the data center 120. By monitoring when persistent volumes are released, the volume management server 140 is enabled to determine how much time has elapsed since the persistent volume was released. When the amount of time that has passed exceeds a predetermined age threshold, the persistent volume is scheduled for deletion. After the persistent volume is deleted, the storage that was being used by the persistent volume is made available for use by other applications.

The application servers 130, the database server 150, the volume management server 140, and the client devices 160A and 160B may each be implemented in a computer system, in whole or in part, as described below with respect to FIG. 8. Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application servers 130, the database server 150, the volume management server 140, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Though FIG. 1 shows only one or two of each element (e.g., one data center 120, one network-based application 110, two application servers 130, two client devices 160, and the like), any number of each element is contemplated. For example, the database server 150 may include dozens or hundreds of active and standby servers and provide data to multiple data centers 120 that provide applications to millions of client devices. Likewise, each application server 130 may access data from multiple database servers 150, and so on.

FIG. 2 is a block diagram 200 of a volume management server 140 suitable for automatically removing unused retained persistent volumes for containerized applications, according to some example embodiments. The volume management server 140 is shown as including a communication module 210, a policy module 220, an annotation module 230, a notification module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the volume management server 140 and transmits data from the volume management server 140. For example, the communication module 210 may receive, from the application server 130A, data indicating that a persistent volume has been released. As another example, the communication module 210 may send notifications to inform users that persistent volumes will be scheduled for deletion.

The policy module 220 enforces data retention polices by determining if a persistent volume has been in a released state for at least an amount of time set by the data retention policy. For example, the policy may state that a user associated with a persistent volume should be notified seven days after the persistent volume is released and, if the user does not request otherwise, the persistent volume be deleted seven days after the notification is sent.

The annotation module 230 detects when persistent volumes are released and associates a date with the release of each persistent volume. For example, when an application releases a persistent volume, a database entry for the persistent volume may be updated to indicate the persistent volume's released status. The annotation module 230 may access the database entry, determine that no date is associated with the release of the persistent volume, and update the database entry (or create a new database entry) that associates a current date with the release of the persistent volume. The associated date may be used by the policy module 220 to determine when the persistent volume should be deleted.

The volume management server 140 may send notifications regarding the deletion of persistent volumes via the notification module 240. For example, the notification module 240 may provide an application programming interface (API) for email, text messages, voice messages, or the like. Using the API provided by the notification module 240, the policy module 220 requests the notification module 240 to send notifications.

Policies, user data, metadata regarding persistent volumes, or any suitable combination thereof may be stored and accessed by the storage module 250. For example, local storage of the volume management server 140, such as a hard drive, may be used. As another example, network storage may be accessed by the storage module 250 via the network 190.

FIG. 3 is a block diagram illustrating a database schema 300 suitable for use by a volume management server, according to some example embodiments. The database schema 300 includes a persistent volume status table 310, a persistent volume info table 340, and a persistent volume claim table 370. The persistent volume status table 310 includes rows 330A, 330B, and 330C of a format 320. The persistent volume info table 340 includes rows 360A, 360B, and 360C of a format 350. The persistent volume claim table 370 includes rows 390A, 390B, and 390C of a format 380. Though FIG. 3 shows only a few rows in each table and only a few tables, more rows and tables are contemplated. For example, the data center 120 of FIG. 1 may include dozens, hundreds, or thousands of persistent volumes, each of which would have one or more corresponding rows in each of the tables of FIG. 3. Additional columns or tables may be used to store additional information, such as an application associated with each persistent volume, contact information for volume owners, and the like.

The persistent volume status table 310 stores, as indicated by the format 320, a volume name, a status for the named volume, a retention policy for the named volume, and a release date for the named volume. The row 330A is for VOL1, which is Bound and will be retained when the application that created it is no longer running. Since VOL1 is active, it is not released, and the release date is NULL. The row 330B stores data for VOL2. VOL2 has been released but is being retained, and was released on Jun. 1, 2023. As shown in the row 330C, VOL3 was released on Jan. 1, 2023, and is scheduled for deletion. The persistent volume status table 310 may be used by the policy module 220 and the annotation module 230 of FIG. 2 to enforce policies relating to removing persistent volumes for containerized applications.

The notification module 240 of FIG. 2 may use the persistent volume info table 340 and the persistent volume claim table 370 to identify an owner of a persistent volume so that a notification can be sent before a persistent volume is deleted or scheduled for deletion. As shown by the format 350, each row of the persistent volume info table 340 includes a volume name, a PVC name for the PVC that resulted in the allocation of the persistent volume to a containerized application, and a storage class for the persistent volume. The PVC name may be cross referenced with the PVC name in the persistent volume claim table 370 to determine the name of the owner of the persistent volume. In this example, USER1 is the owner of VOL1, USER2 is the owner of VOL2, and USER3 is the owner of VOL3.

The persistent volume info 340 also indicates the storage class of the persistent volume. The storage class RWM-RETAIN for the persistent volumes VOL1 and VOL2 is for a retained persistent volume with read-write access. The storage class RO-RETAIN for the persistent volume VOL3 is for a retained persistent volume with read-only access.

Figure 4:
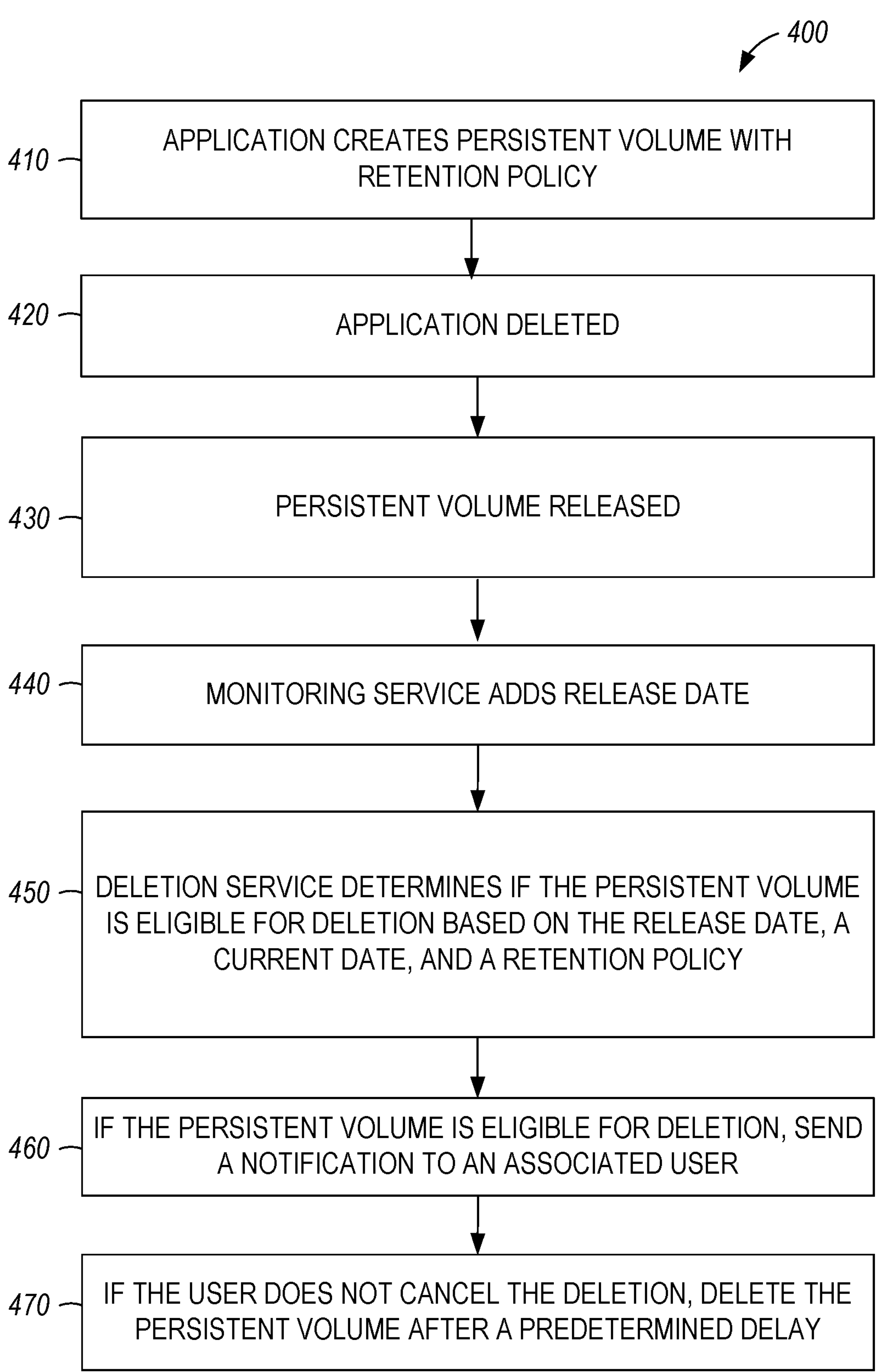
FIG. 4 is a flowchart illustrating operations of an example method suitable for automatically removing unused retained persistent volumes for containerized applications.

FIG. 4 is a flowchart illustrating operations of an example method 400 suitable for automatically removing unused retained persistent volumes for containerized applications. The method 400 includes operations 410, 420, 430, 440, 450, 460, and 470. By way of example and not limitation, the method 400 is described as being performed by the volume management server 140 of FIG. 1, using the modules 210-250 of FIG. 2 and the database schema 300 of FIG. 3.

In operation 410, an application (e.g., an application running on the application server 130A of FIG. 1) creates a persistent volume with a retention policy. When a persistent volume is created with a retention policy, the persistent volume is not automatically deleted when the application terminates. Instead, the data in the persistent volume remains available if the application is run again. The policy for the volume may be stored in a database, such as in the retention field of the persistent volume status table 310 of FIG. 3.

The application stops using the persistent volume in operation 420. For example, the application may be deleted (as shown in FIG. 4) from the containerized application server, may stop execution without being deleted, or any suitable combination thereof.

In operation 430, the persistent volume is released. The persistent volume may be released by the containerized environment (e.g., a Kubernetes cluster) upon detecting that the application that created the persistent volume is no longer running or has been deleted. The status of the volume in a database may be updated to reflect that the volume has been released, as in the example of the row 330B of FIG. 3.

The annotation module 230 of FIG. 2, in operation 440, adds a release date to data for the persistent volume. For example, after operation 430 is complete, the status field for the row 330B may indicate that the volume has been released and will be retained, but the release date may be null. The annotation module 230 may periodically search the database for volumes that have been released but do not have release dates and update the corresponding rows to indicate the current date.

In operation 450, the policy module 220 determines if the persistent volume is eligible for deletion based on the release date, a current date, and a retention policy. For example, the retention policy may indicate that an owner of the persistent volume should be notified when the current date is seven days after the release date, and the persistent volume deleted three days after notification if the owner does not object. The retention policy may include a predetermined age threshold (e.g., a period of time such as three days or seven days) after which unused persistent volumes should be deleted. Operation 450 may be performed by the policy module 220 repeatedly checking the manifest, at a predetermined interval (e.g., daily), to determine if any persistent volumes have been released for at least a predetermined amount of time defined by the retention policy.

If the persistent volume is eligible for deletion (as determined by operation 450), the notification module 240 sends a notification to an associated user (operation 460). In some example embodiments, the persistent volume owner info table 340 and the persistent volume claim table 370 are used to determine which user to notify.

In operation 470, if the user does not cancel the deletion, the policy module 220 deletes the persistent volume after a predetermined delay. Continuing with the example policy discussed above, the predetermined delay is three days. If a response is received from the user within three days (the predetermined delay) then the persistent volume is not deleted. Otherwise, the persistent volume is deleted three days after notification.

In some example embodiments, no notification is sent and the persistent volume is automatically deleted when the difference between the current date and the release date meets or exceeds a predetermined age threshold (e.g., 7 days or 30 days). In other example embodiments, operations 410-460 serve as a notification service and operation 470 is not performed. Instead, the user is enabled to act on the information and delete the persistent volume.

Operations 440-470 may be performed by an application having a Kubernetes service account token and using role-based access control (RBAC). The application may be granted the minimum required privileges to perform the operations, ensuring that other cluster resources remain unaffected even if the token is accessed by an unauthorized entity. An example service account creation yaml (yet another markup language) file is shown below.

```
appVersion: v1
kind: ServiceAccount
metadata:
  name: pv-operator
  namespace: kube-system
apiVersion: v1
kind: Secret
metadata:
  annotations:
    kubernetes.io/service-account.name: pv-operator
  name: pv-operator-token
  namespace: kube-system
type: kubernetes.io/service-account-token
```

The above sample creates a pv-operator service account that operates in the kube-system namespace. Once created, RBAC authorization is provided to the service account. An example RBAC sample is shown below.

```
apiVersion: rbac.authorization.k8s.io/v1
kind: ClusterRole
metadata:
    name: pv-operator
rules:
- api Groups: [“”]
  resources:
  - persistentvolumes
  verbs: [“list”, “patch”]
apiVersion: rbac.authorization.k8s.io/v1
kind: ClusterRoleBinding
metadata:
    name: pv-operator
    namespace: kube-system
roleRef:
    apiGroup: rbac.authorization.k8s.io
    kind: ClusterRole
    name: pv-operator
subjects:
    - kind: ServiceAccount
    name: pv-operator
    namespace: kube-system
```

The above example gives the pv-operator service account the ability to list and patch persistent volumes. Thus, the pv-operator service account is enabled to determine which persistent volumes have been retained, which have been released, and the like, and to update the status of persistent volumes, delete persistent volumes, and the like. A single account may be used to manage multiple clusters, both local and remote. The example configuration file below includes multiple cluster URLs (uniform resource locators) that are monitored.

```
#!/usr/bin/env python
'''Configuration data'''
MAIL__SERVER = “mail.dcxxx.sf.priv.”
ALL__RECEIVER__LIST = [ “xxx@global.corp.com” ]
TEST__RECEIVER__LIST = [ “xxx@corp.com” ]
DC__CONFIG = {
  ‘sc25k8sc101’: {
    ‘K8SAPI__URL’: ‘https://1.1.1.1’,
    ‘TOKEN’ : ‘eyJhbGciOiJSUzI1NiIsImtpZ’
  },
  ‘sc25k8sc103’ {
    ‘K8SAPI__URL’: ‘https://1.1.1.2’,
    ‘TOKEN’: ‘eyJhbGciOiJSUzI1NiIsImtpZ’
  },
  ‘025qaapp01’ : {
    ‘K8SAPI__URL’: ‘https://api.025qaapp01.com’,
    ‘TOKEN’: ‘eyJhbGciOiJSUzI1NiIsImtpZ’
  }
}
```

In the above Python file, three URLs are defined, along with the authorization token to use to access each URL. Using this data, the pv-operator service account is enabled to communicate with remote clusters to monitor and manage persistent volumes. The application may be deployed as a daily cronjob in one cluster to monitor that cluster and remote clusters. The cronjob file portion below is presented as an example.

```
containers:
- name: pvop
  command:
  - /usr/local/bin/python
  - pvop.py
  env:
  - name: PYTHONPATH
    value: /opt/cm
  volumeMounts:
  - name: config
    mountPath: “/opt/cm”
    readOnly: true
  image: xxx.common.repositories.cloud/tools/pvop:0.3
restartPolicy: OnFailure
volumes:
  - name: config
    secret:
      secretName: pvscanconfig
```

The above sample executes a pvop.py Python script with the specified volumes and environment variables. Below is a sample portion of the Python script.

```
for i in pvs.items:
  # Only check “Released” PVs
  if i.status.phase == “Released”:
    print(“%s\t%s\t%s\t%s\t%s\t%s\n” % (i.metadata.name,
i.metadata.annotations, i.spec.claim__ref.name, i.spec.claim__ref. ...)
    if not i.metadata.annotations.___contains___(‘released__day’):
      annotations = [
        {
          ‘op’: ‘add’, #Options: replace, add, remove
          ‘path’: ‘/metadata/annotations/released__day’,
          ‘value’: datetime.utcnow( ).strftime(‘%y-m-%d’)
        }
      ]
```

-continued

```
      # add "released__day" annotation in the PV
      api__instance.patch__persistent__volume(name=i.metadata.name, body=annotations)
   else:
      #delete PV if released more than 15 days
      if (datetime.utcnow( ) − timedelta(days=15)) >
datetime.strptime(i.metadata.annotations['released__day'], "%Y-%m-%d")
         print("delete PV % s" % i.metadata.name)
         annotations = [
            {
               'op': 'replace',
               'path': '/spec/persistentVolumeReclaimPolicy',
               'value': 'Delete' # options: Delete, Recycle, Retain
            }
         ]
```

The above script considers each persistent volume item, skipping the persistent volumes that do not have a status.phase of "Released." If the persistent volume does not have a released_day annotation, the script adds one, with a value of the current day. Otherwise, if the difference between the released_day and the current day is greater than 15 days, the reclaim policy for the persistent volume is updated to be "Delete." Thereafter, a reclaim process will detect the Delete status and remove the persistent volume.

By way of the method 400, a containerized application environment is enabled to automatically delete persistent volumes in response to determining that the persistent volumes are not being used. As a result, storage resources of the containerized application environment are conserved. The containerized application environment may include hundreds or thousands of containerized applications, persistent volumes, or any suitable combination thereof. Accordingly, the method 400 may be repeated for multiple applications and volumes. For example, operation 440 may be repeated by the annotation module 230 of FIG. 2, such that, based on a determination that a second persistent volume of a second containerized application computing cluster has been released, the annotation module 230 updates the manifest to include a date on which the second persistent volume was released. The updating of the manifest to include the date on which the second persistent volume was released may be based on the manifest indicating that the second persistent volume was released on an unknown date, and include updating the manifest to indicate that the second persistent volume was released on the current date.

Figure 5:
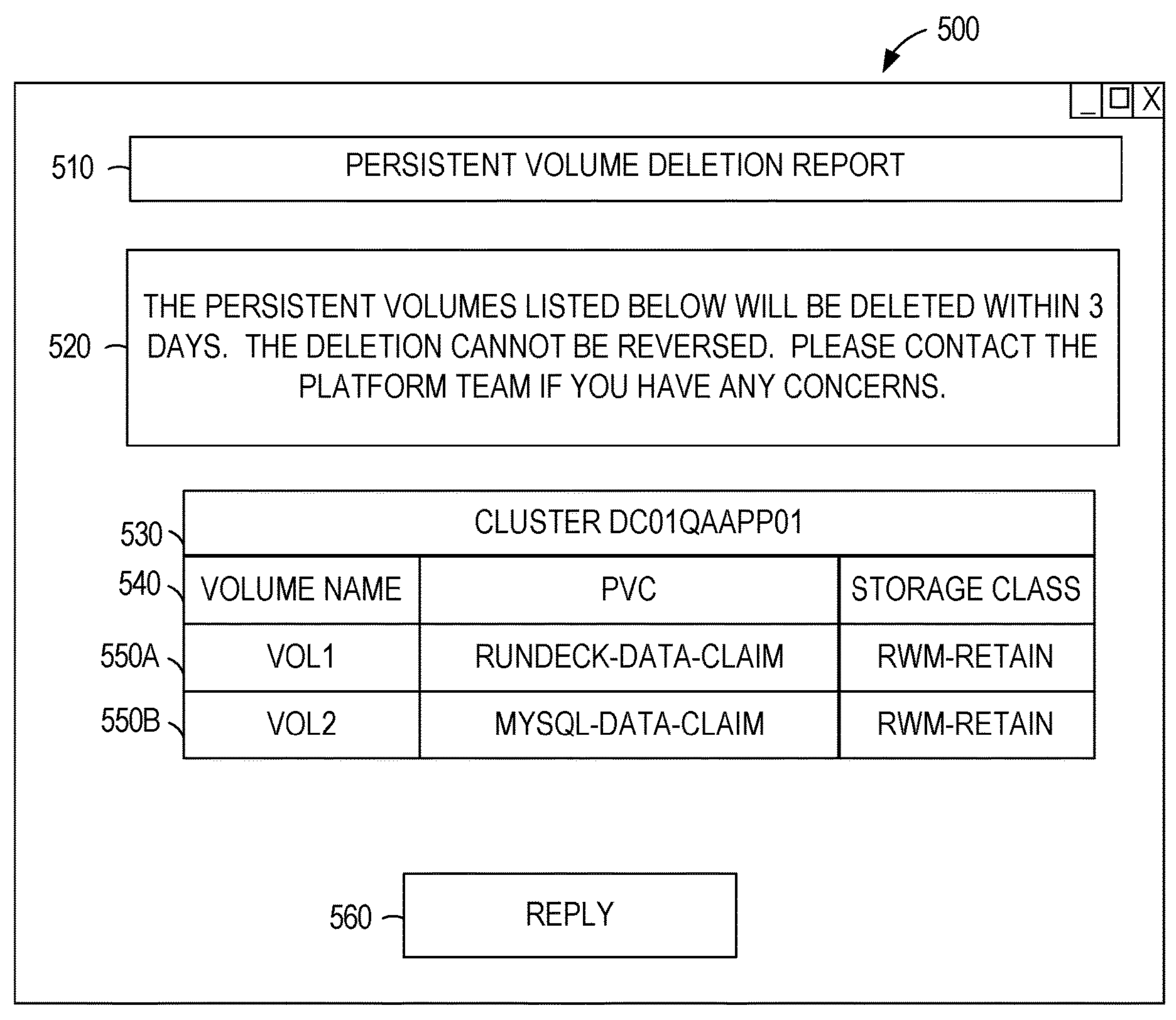
FIG. 5 is a block diagram illustrating a user interface for informing a user of unused retained persistent volumes that will be automatically removed, according to some example embodiments.

FIG. 5 is a block diagram illustrating a user interface 500 for informing a user of unused retained persistent volumes that will be automatically removed, according to some example embodiments. The user interface 500 may be presented to a user receiving the notification sent in operation 450 of the method 400 of FIG. 4. The user interface 500 includes a title 510, an informational message 520, a table 530, and a button 560. The table 530 includes rows 550A and 550B of a format 540.

The title 510 indicates that the user interface 500 is for a persistent volume deletion report. As indicated by the informational message 520, the user interface 500 includes a list of persistent volumes that will be deleted within a predetermined period of time (three days in the example of FIG. 5). The user is also invited to communicate with an administrator, a manager, or a platform team if they object to the deletion.

The header of the table 530 indicates that the persistent volumes being deleted are in cluster DC01QAAPP01. A persistent volume report may include information for multiple clusters, and thus include multiple tables 530.

Each of the rows 550A-550B includes a volume name, a PVC name, and a storage class name, as indicated by the format 540. The volume name may have been assigned by the application that created the persistent volume, by the containerized application execution environment, by an administrator, or any suitable combination thereof. The PVC name may have been created by the application that claimed the persistent volume. The storage class indicates the storage class used in the PVC to claim the persistent volume. As indicated by the informational message 520, all volumes listed in the table 530 are scheduled for deletion.

The button 560 is operable by the user to send a message to request that one or more of the volumes identified in the table 530 not be deleted. For example, clicking the button 560 may cause an email interface to be presented that includes an email address for the person or team responsible for changing the status of the persistent volumes to avoid unwanted deletion.

Figure 6:
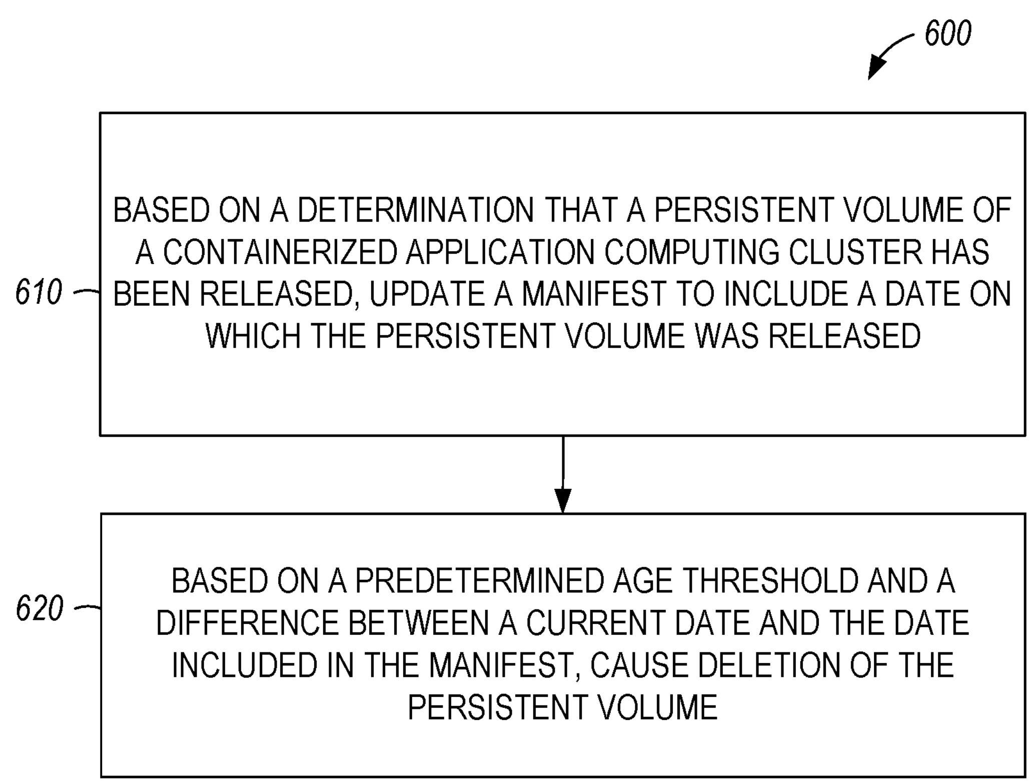
FIG. 6 is a flowchart illustrating operations of an example method suitable for automatically removing unused retained persistent volumes for containerized applications.

FIG. 6 is a flowchart illustrating operations of an example method 600 suitable for automatically removing unused retained persistent volumes for containerized applications. The method 600 includes operations 610 and 620. By way of example and not limitation, the method 600 is described as being performed by the volume management server 140 of FIG. 1, using the modules 210-250 of FIG. 2 and the database schema 300 of FIG. 3.

In operation 610, based on a determination that a persistent volume of a containerized application computing cluster has been released, the annotation module 230 updates a manifest (e.g., the persistent volume status table 310) to include a date on which the persistent volume was released. For example, the annotation module 230 may comprise a program that is run daily or hourly and detects persistent volumes that have been released but for which there is no known release date. The current date may be added, as the release date, to data for the persistent volume.

The policy module 220, in operation 620, based on a predetermined age threshold and a difference between a current date and the date included in the manifest, causes deletion of the persistent volume. The policy module 220 may comprise a program that is run daily or hourly and determines a difference between a current date and the date included in the manifest for each released persistent volume. When the difference exceeds a predetermined age threshold (e.g., 7 days, 10 days, 30 days, or 365 days), the policy module 220 deletes the persistent volume or causes the persistent volume to be deleted by another process. For example, the causing of the persistent volume to be deleted may include updating a reclaim policy of the persistent volume, such as by updating the retention field in the persistent volume status table 310 to indicate that the persistent volume should be deleted. To illustrate, the retention field may be set to Delete as in the row 330C. Another process may periodically check for persistent volumes having that retention policy and, based on the retention policy, delete them.

Based on the predetermined age threshold and the difference between a current date and the date included in the manifest, before causing the deletion of the persistent volume, the notification module 240 may send a notification to an administrator that indicates that the persistent volume will be deleted.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a memory that stores instructions; and one or more processors coupled to the memory and configured to execute the instructions to perform operations comprising: based on a determination that a persistent volume of a containerized application computing cluster has been released, updating a manifest to include, a date on which the persistent volume was released; and based on a predetermined age threshold and a difference between a current date and the date included in the manifest, causing deletion of the persistent volume.

In Example 2, the subject matter of Example 1, wherein the operations further comprise: based on the predetermined age threshold and the difference between a current date and the date included in the manifest, before causing the deletion of the persistent volume, sending a notification to an administrator that indicates that the persistent volume will be deleted.

In Example 3, the subject matter of Examples 1-2, wherein the operations further comprise: based on a determination that a second persistent volume of a second containerized application computing cluster has been released, updating the manifest to include a date on which the second persistent volume was released.

In Example 4, the subject matter of Examples 1-3, wherein the operations further comprise: based on the manifest indicating that a second persistent volume has been released on an unknown date, updating the manifest to indicate that the second persistent volume was released on the current date.

In Example 5, the subject matter of Examples 1-4, wherein the causing of the persistent volume to be deleted comprises updating a reclaim policy of the persistent volume.

In Example 6, the subject matter of Examples 1-5, wherein the containerized application computing cluster is a Kubernetes cluster.

In Example 7, the subject matter of Examples 1-6, wherein the operations further comprise: repeatedly checking the manifest, at a predetermined interval, to determine if any persistent volumes have been released for at least a predetermined amount of time.

Example 8 is a non-transitory computer-readable medium that stores instructions that, when executed by one or more processors, cause the one or more processors to perform operations comprising: based on a determination that a persistent volume of a containerized application computing cluster has been released, updating a manifest to include a date on which the persistent volume was released; and based on a predetermined age threshold and a difference between a current date and the date included in the manifest, causing deletion of the persistent volume.

In Example 9, the subject matter of Example 8, wherein the operations further comprise: based on the predetermined age threshold and the difference between a current date and the date included in the manifest, before causing the deletion of the persistent volume, sending a notification to an administrator that indicates that the persistent volume will be deleted.

In Example 10, the subject matter of Examples 8-9, wherein the operations further comprise: based on a determination that a second persistent volume of a second containerized application computing cluster has been released, updating the manifest to include a date on which the second persistent volume was released.

In Example 11, the subject matter of Examples 8-10, wherein the operations further comprise: based on the manifest indicating that a second persistent volume has been released on an unknown date, updating the manifest to indicate that the second persistent volume was released on the current date.

In Example 12, the subject matter of Examples 8-11, wherein the causing of the persistent volume to be deleted comprises updating a reclaim policy of the persistent volume.

In Example 13, the subject matter of Examples 8-12, wherein the containerized application computing cluster is a Kubernetes cluster.

In Example 14, the subject matter of Examples 8-13, wherein the operations further comprise: repeatedly checking the manifest, at a predetermined interval, to determine if any persistent volumes have been released for at least a predetermined amount of time.

Example 15 is a method comprising: based on a determination that a persistent volume of a containerized application computing cluster has been released, updating a manifest to include, a date on which the persistent volume was released; and based on a predetermined age threshold and a difference between a current date and the date included in the manifest, causing deletion of the persistent volume.

In Example 16, the subject matter of Example 15 includes, based on the predetermined age threshold and the difference between a current date and the date included in the manifest, before causing the deletion of the persistent volume, sending a notification to an administrator that indicates that the persistent volume will be deleted.

In Example 17, the subject matter of Examples 15-16 includes, based on a determination that a second persistent volume of a second containerized application computing cluster has been released, updating the manifest to include a date on which the second persistent volume was released.

In Example 18, the subject matter of Examples 15-17 includes, based on the manifest indicating that a second persistent volume has been released on an unknown date, updating the manifest to indicate that the second persistent volume was released on the current date.

In Example 19, the subject matter of Examples 15-18, wherein the causing of the persistent volume to be deleted comprises updating a reclaim policy of the persistent volume.

In Example 20, the subject matter of Examples 15-19, wherein the containerized application computing cluster is a Kubernetes cluster.

Example 21 is an apparatus comprising means to implement any of Examples 1-20.

Figure 7:
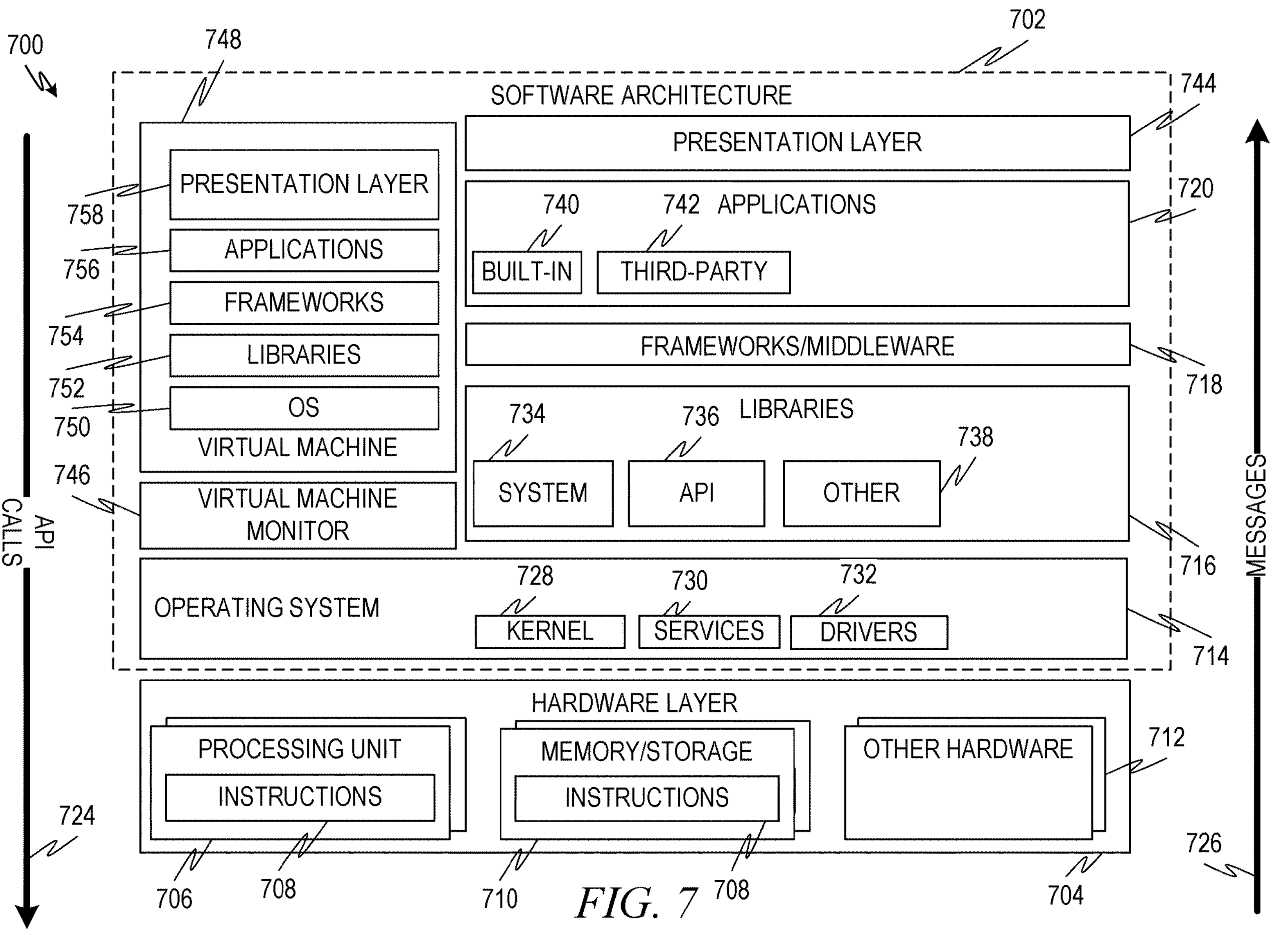
FIG. 7 is a block diagram showing one example of a software architecture for a computing device.

FIG. 7 is a block diagram 700 showing one example of a software architecture 702 for a computing device. The software architecture 702 may be used in conjunction with various hardware architectures, for example, as described herein. FIG. 7 is merely a non-limiting example of a software architecture and many other architectures may be implemented to facilitate the functionality described herein. A representative hardware layer 704 is illustrated and can represent, for example, any of the above referenced computing devices. In some examples, the hardware layer 704 may be implemented according to the architecture of the computer system of FIG. 7.

The representative hardware layer 704 comprises one or more processing units 706 having associated executable instructions 708. Executable instructions 708 represent the executable instructions of the software architecture 702, including implementation of the methods, modules, subsystems, and components, and so forth described herein and may also include memory and/or storage modules 710, which also have executable instructions 708. Hardware layer 704 may also comprise other hardware as indicated by other hardware 712 which represents any other hardware of the hardware layer 704, such as the other hardware illustrated as part of the software architecture 702.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and presentation layer 744. Operationally, the applications 720 and/or other components within the layers may invoke application programming interface (API) calls 724 through the software stack and access a response, returned values, and so forth illustrated as messages 726 in response to the API calls 724. The layers illustrated are representative in nature and not all software architectures have all layers. For example, some mobile or special purpose operating systems may not provide a frameworks/middleware 718 layer, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the software architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks/middleware 718 may provide a higher-level common infrastructure that may be utilized by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any of the built-in applications as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 742 may invoke the API calls 724 provided by the mobile operating system such as operating system 714 to facilitate functionality described herein.

The applications 720 may utilize built in operating system functions (e.g., kernel 728, services 730 and/or drivers 732), libraries (e.g., system libraries 734, API libraries 736, and other libraries 738), frameworks/middleware 718 to create user interfaces to interact with users of the system. Alternatively, or additionally, in some systems, interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware computing device. A virtual machine is hosted by a host operating system (operating system 714) and typically, although not always, has a virtual machine monitor 746, which manages the operation of the virtual machine 748 as well as the interface with the host operating system (i.e., operating system 714). A software architecture executes within the virtual machine 748 such as an operating system 750, libraries 752, frameworks/middleware 754, applications 756 and/or presentation layer 758. These layers of software architecture executing within the virtual machine 748 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array [FPGA] or an application-specific integrated circuit [ASIC]) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 8:
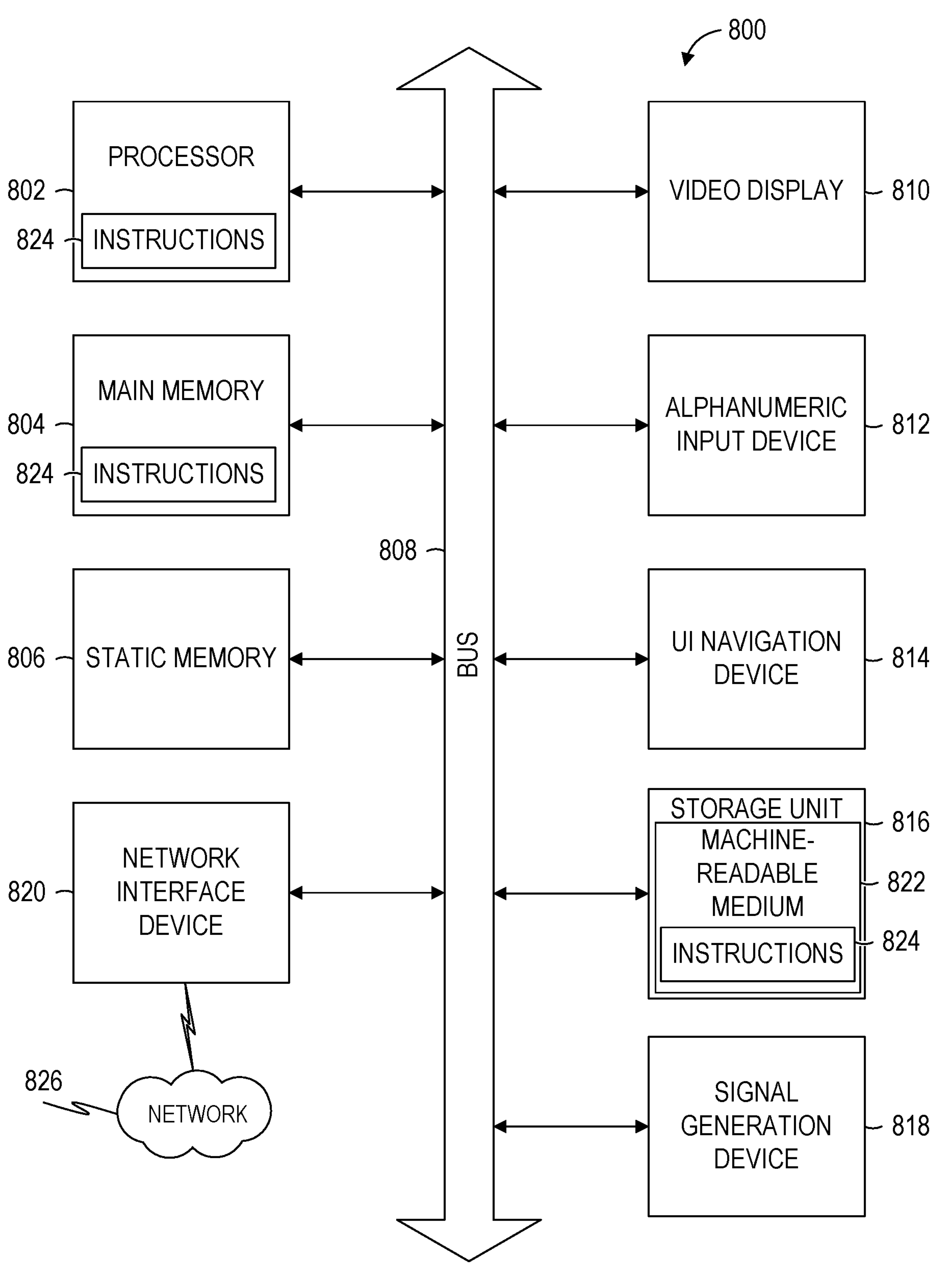
FIG. 8 is a block diagram of a machine in the example form of a computer system within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation (or cursor control) device 814 (e.g., a mouse), a storage unit 816, a signal generation device 818 (e.g., a speaker), and a network interface device 820.

Machine-Readable Medium

The storage unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting a machine-readable medium 822.

While the machine-readable medium 822 is shown in FIG. 8 to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 824 may further be transmitted or received over a communications network 826 using a transmission medium. The instructions 824 may be transmitted using the network interface device 820 and any one of a number of well-known transfer protocols (e.g., hypertext transport protocol [HTTP]). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:
- a memory that stores instructions; and
- one or more processors coupled to the memory and configured to execute the instructions to perform operations comprising:
  - based on a determination that a first persistent volume of a containerized application computing cluster has been released, updating a manifest to include a date on which the first persistent volume was released;
  - based on a predetermined age threshold and a difference between a current date and the date included in the manifest, identifying an administrator associated with the first persistent volume;
  - sending a notification to the administrator that indicates that the first persistent volume will be deleted;
  - after the sending of the notification, based on the predetermined age threshold and a difference between a later current date and the date included in the manifest, causing deletion of the first persistent volume; and
  - based on the manifest indicating that a second persistent volume has been released on an unknown date, updating the manifest to indicate that the second persistent volume was released on the current date.

2. The system of claim 1, wherein the operations further comprise:
- based on a determination that a third persistent volume of a second containerized application computing cluster has been released, updating the manifest to include a date on which the third persistent volume was released.

3. The system of claim 1, wherein the causing of the first persistent volume to be deleted comprises updating a reclaim policy of the first persistent volume.

4. The system of claim 1, wherein the containerized application computing cluster is a Kubernetes cluster.

5. The system of claim 1, wherein the operations further comprise:
- repeatedly checking the manifest, at a predetermined interval, to determine if any persistent volumes have been released for at least a predetermined amount of time.

6. The system of claim 1, wherein the causing of the deletion of the first persistent volume occurs at a predetermined period of time after the sending of the notification.

7. The system of claim 6, wherein the predetermined period of time is seven days.

8. The system of claim 1, wherein the operations further comprise releasing the first persistent volume based on a status of an application associated with the first persistent volume.

9. A non-transitory computer-readable medium that stores instructions that, when executed by one or more processors, cause the one or more processors to perform operations comprising:
- based on a determination that a first persistent volume of a containerized application computing cluster has been released, updating a manifest to include a date on which the first persistent volume was released;
- based on a predetermined age threshold and a difference between a current date and the date included in the manifest, identifying an administrator associated with the first persistent volume;
- sending a notification to the administrator that indicates that the first persistent volume will be deleted;
- after the sending of the notification, based on the predetermined age threshold and a difference between a later current date and the date included in the manifest, causing deletion of the first persistent volume; and
- based on the manifest indicating that a second persistent volume has been released on an unknown date, updating the manifest to indicate that the second persistent volume was released on the current date.

10. The non-transitory computer-readable medium of claim 9, wherein the operations further comprise:
- based on a determination that a third persistent volume of a second containerized application computing cluster has been released, updating the manifest to include a date on which the third persistent volume was released.

11. The non-transitory computer-readable medium of claim 9, wherein the causing of the first persistent volume to be deleted comprises updating a reclaim policy of the first persistent volume.

12. The non-transitory computer-readable medium of claim 9, wherein the containerized application computing cluster is a Kubernetes cluster.

13. The non-transitory computer-readable medium of claim 9, wherein the operations further comprise:
- repeatedly checking the manifest, at a predetermined interval, to determine if any persistent volumes have been released for at least a predetermined amount of time.

14. The non-transitory computer-readable medium of claim 9, wherein the causing of the deletion of the first persistent volume occurs at a predetermined period of time after the sending of the notification.

15. The non-transitory computer-readable medium of claim 14, wherein the predetermined period of time is seven days.

16. The non-transitory computer-readable medium of claim 9, wherein the operations further comprise releasing the first persistent volume based on a status of an application associated with the first persistent volume.

17. A method comprising:
- determining that a first persistent volume of a containerized application computing cluster has been released;
- updating a manifest to include a date on which the first persistent volume was released;
- comparing a predetermined age threshold and a difference between a current date and the date included in the manifest;
- identifying an administrator associated with the first persistent volume;

sending a notification to the administrator that indicates that the first persistent volume will be deleted;

comparing the predetermined age threshold with a difference between a later current date and the date included in the manifest;

after the sending of the notification, causing deletion of the first persistent volume;

determining that a second persistent volume has been released on an unknown date; and updating the manifest to indicate that the second persistent volume was released on the current date.

18. The method of claim 17, further comprising:

based on a determination that a third persistent volume of a second containerized application computing cluster has been released, updating the manifest to include a date on which the third persistent volume was released.

19. The method of claim 17, wherein the causing of the first persistent volume to be deleted comprises updating a reclaim policy of the first persistent volume.

20. The method of claim 17, wherein the containerized application computing cluster is a Kubernetes cluster.

* * * * *